(12) United States Patent
Jayaraman et al.

(10) Patent No.: US 7,035,329 B2
(45) Date of Patent: Apr. 25, 2006

(54) SOFT SLICER IN A HYBRID DECISION FEEDBACK EQUALIZER

(75) Inventors: Srikant Jayaraman, San Diego, CA (US); Ivan Jesus Fernandez Corbaton, San Diego, CA (US); John E. Smee, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 586 days.

(21) Appl. No.: 10/199,158

(22) Filed: Jul. 18, 2002

(65) Prior Publication Data

US 2004/0013189 A1    Jan. 22, 2004

(51) Int. Cl.
*H04L 27/18* (2006.01)

(52) U.S. Cl. .................. 375/233; 375/222; 375/229; 375/232

(58) Field of Classification Search ............... 375/233, 375/262, 260
See application file for complete search history.

(56) References Cited

U.S. PATENT DOCUMENTS 6,449,246 B1 *   9/2002   Barton et al. .............. 370/210
2003/0086504 A1 * 5/2003   Magee et al. .............. 375/262

OTHER PUBLICATIONS

Jayaraman et al., "Hybrid Decision Feedback Equalization," 2003 International Conference On Communications, vol. 4, Anchorage, AK, May 11, 2003, pp. 2380-2384.

Bednarz et al., "Decision Feedback Equalization for Channels with Error Correcting Capabilities," IEEE International Conference on Montreal, Quebec, Canada, Jun. 8, 1997, pp. 1607-1612.

Kennedy et al., "Quantizer Design and Optimization in Decision Feedback Equalization," Fourth International Symposium on Signal Processing and Its Applications, vol 2, Aug. 25, 1996, pp. 614-617.

Marco Chiani, "Introducing Erasures in Decision-Feedback Equalization to Reduce Error Propagation," IEEE Transactions On Communications, vol. 45, No. 7, New York, U.S.A., Jul. 1, 1997, pp. 757-760.

Ariyavisitakul et al., "Joint Coding and Decision Feedback Equalization for Broadband Wireless Channels," Vehicular Technology Conference, 48th IEEE, Ottawa, Canada, May 18, 1998, pp. 2256-2261.

* cited by examiner

*Primary Examiner*—Stephen Chin
*Assistant Examiner*—Jaison Joseph
(74) *Attorney, Agent, or Firm*—Philip Wadsworth; Sandra L. Godsey; Sandra L. Godsey

(57) ABSTRACT

A method and apparatus for estimating a transmitted symbol from a received sample as a function of Signal-to-Interference and Noise Ratio (SINR) of the received sample. The received sample is quantized and mapped to a region of a grid overlaid on the transmitted symbol constellation. The region may correspond to a symbol estimate value or may be processed further to obtain a symbol estimate value. The regions in one embodiment are rectangular. The symbol estimate values may be stored in a memory storage unit.

23 Claims, 12 Drawing Sheets

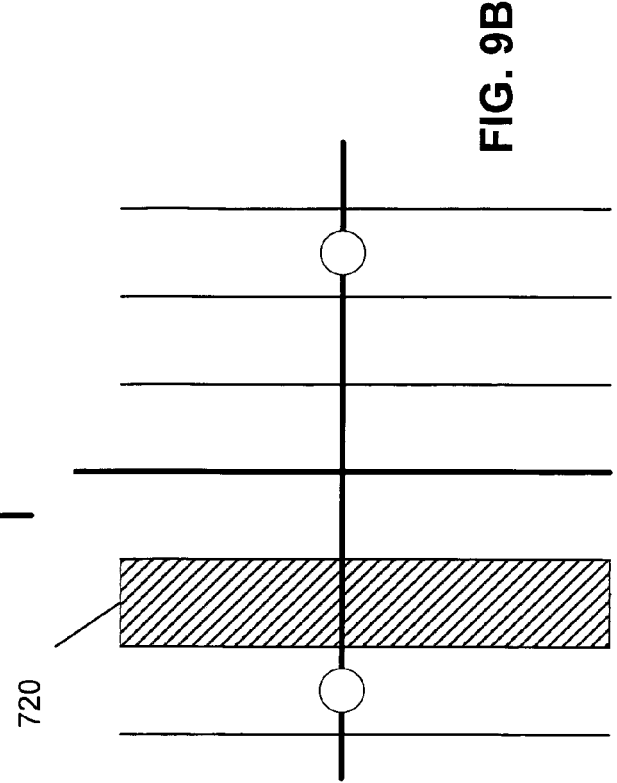
FIG. 9A
FIG. 9B
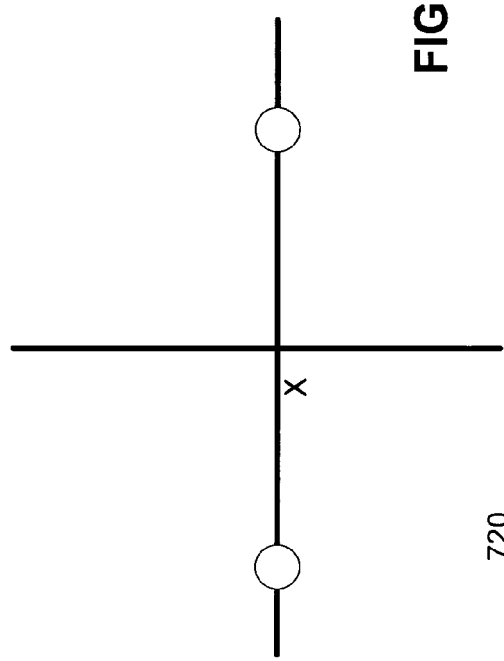
720
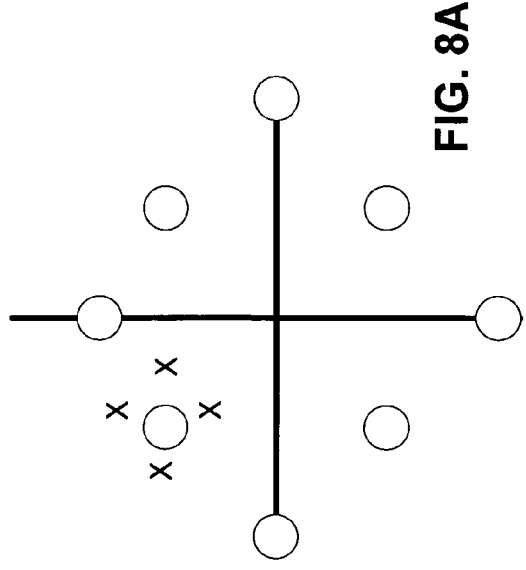
FIG. 8A
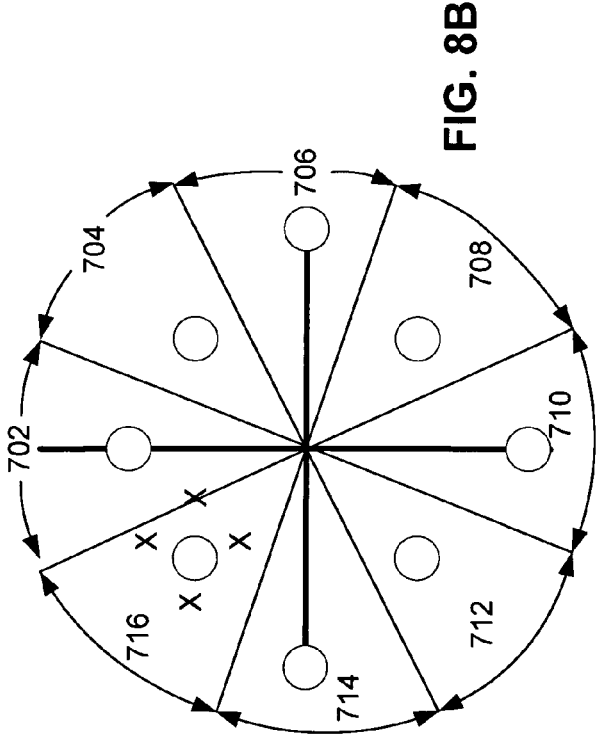
FIG. 8B

US 7,035,329 B2

SOFT SLICER IN A HYBRID DECISION FEEDBACK EQUALIZER

REFERENCE TO CO-PENDING APPLICATION FOR PATENT

The present Application for Patent is related to "Method and Apparatus for Hybrid Decision Feedback Equalization" by Srikant Jayaraman, having Ser. No. 10/199,159, filed concurrently herewith, and assigned to the assignee hereof.

BACKGROUND

1. Field

The present invention relates generally to equalization of a received signal, and more specifically to hybrid decision feedback equalization.

2. Background

The transmission of digital information typically employs a modulator that maps digital information into analog waveforms. The mapping is generally performed on blocks of bits contained in the information sequence to be transmitted. The waveforms may differ in amplitude, phase, frequency or a combination thereof. The information is then transmitted as the corresponding waveform. The process of mapping from the digital domain to the analog domain is referred to as modulation.

In a wireless communication system, the modulated signal is transmitted over a radio channel. A receiver then demodulates the received signal to extract the original digital information sequence. At the receiver, the transmitted signal is subject to linear distortions introduced by the channel, as well as external additive noise and interference. The characteristics of the channel are generally time varying and are therefore not known a priori to the receiver. Receivers compensate for the distortion and interference introduced by the channel in a variety of ways. One method of compensating for distortion and reducing interference in the received signal employs an equalizer. Equalization generally encompasses methods used to reduce distortion effects in a communication channel. From the received signal, an equalizer generates estimates of the original digital information.

Current equalization methods are based on assumptions regarding the received signal. Such assumptions are generally not correct over a variety of coding, modulation and transmission scenarios, and, therefore, these equalizers do not perform well under many conditions. Additionally, current equalizers employing decision feedback often suffer from error propagation effects that amplify the effect of isolated decision errors. Additionally, the decision feedback process involves hard decisions regarding each symbol and does not consider the likelihood that a symbol decision is correct.

There is, therefore, a need in the art for an equalization method that reduces linear distortion in a received signal over a variety of operating conditions. Still further, there is a need to reduce error propagation in a decision feedback equalizer. Additionally, there is a need to provide a likelihood measure to the decision feedback process.

BRIEF DESCRIPTION OF THE DRAWINGS

FIG. 8A is a constellation mapping for 8-Phase Shift Keying (PSK).

FIG. 8B illustrates grid regions used for soft slicer decisions as overlaid on the constellation mapping of FIG. 8B.

FIG. 9A is a constellation mapping for a Binary Phase Shift Keying (BPSK) or 2-PSK case.

FIG. 9B illustrates grid regions used for soft slicer decisions as overlaid on the constellation mapping of FIG. 9A.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1A:
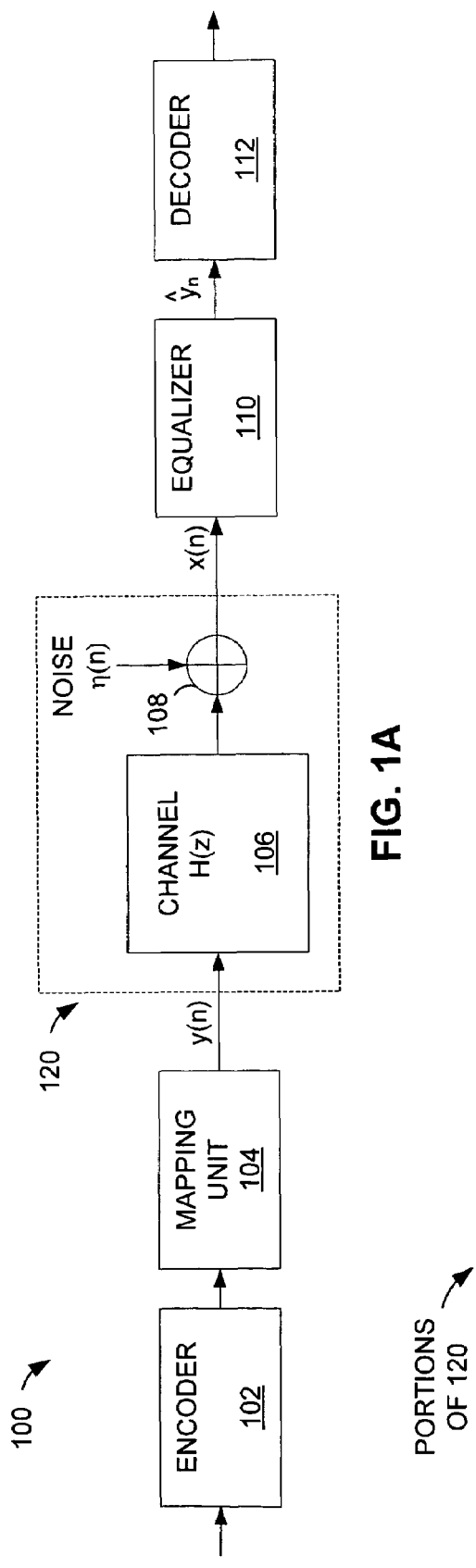
FIG. 1A is a block diagram of components in a communication system.

FIG. 1A illustrates a portion of the components of a communication system 100. Other blocks and modules may be incorporated into a communication system in addition to those blocks illustrated. Bits produced by a source (not shown) are framed, encoded, and then mapped to symbols in a signaling constellation. The sequence of binary digits provided by the source is referred to as the information sequence. The information sequence is encoded by encoder 102 which outputs a bit sequence. The output of encoder 102 is provided to mapping unit 104, which serves as the interface to the communication channel. The mapping unit 104 maps the encoder output sequence into symbols y(n) in a complex valued signaling constellation. Further transmit processing, including modulation blocks, as well as the communication channel and analog receiver processing, are modeled by section 120.

Figure 1B:
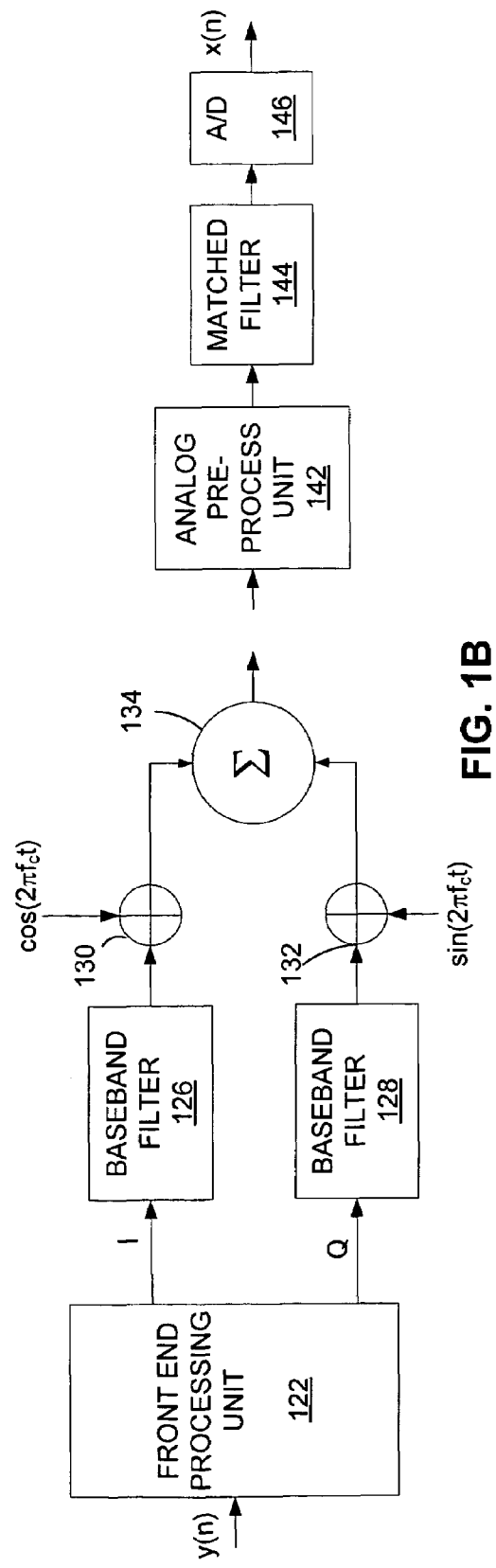
FIG. 1B is a detailed portion of the communication system as in FIG. 1A.

FIG. 1B illustrates some of the details included within section 120 of FIG. 1A. As illustrated in FIG. 1B, the complex symbols y(n) are modulated onto an analog signal pulse, and the resulting complex baseband waveform is sinuosoidally modulated onto the in-phase and quadrature-phase branches of a carrier signal. The resulting analog signal is transmitted by an RF antenna (not shown) over a communication channel. A variety of modulation schemes may be implemented in this manner, such as M-ary Phase Shift Keying (M-PSK), $2^M$-ary Quadrature Amplitude Modulation ($2^M$ QAM), etc.

Each modulation scheme has an associated "signaling constellation" that maps one or more bits to a unique complex symbol. For example, in 4-PSK modulation, two encoded bits are mapped into one of four possible complex values {1,i,−1,i}. Hence each complex symbol y(n) can take on four possible values. In general for M-PSK, log$_2$M encoded bits are mapped to one of M possible complex values lying on the complex unit circle.

Continuing with FIG. 1A, at the receiver, the analog waveform is down-converted, filtered and sampled, such as at a suitable multiple of the Nyquist rate. The resulting samples x(n) are processed by the equalizer 110 which corrects for signal distortions and other noise and interference introduced by the channel, as modeled by section 120. The equalizer 110 outputs estimates of the transmitted symbols ŷ(n). The symbol estimates are then processed by a decoder to determine the original information bits, i.e., the source bits that are the input to encoder 102.

The combination of a pulse-filter, an I-Q modulator, the channel, and an analog processor in the receiver's front-end, illustrated in FIG. 1A and FIG. 1B, is modeled by a linear filter 106 having an impulse response {h$_k$} and a z-transform H(z), wherein the interference and noise introduced by the channel are modeled as Additive White Gaussian Noise (AWGN).

FIG. 1B details processing section 120 as including a front end processing unit 122 coupled to baseband filters 126 and 128 for processing the In-phase (I) and Quadrature (Q) components, respectively. Each baseband filter 126, 128 is then coupled to a multiplier 130 and 132, respectively, for multiplication with a respective carrier. The resultant waveforms are then summed at summing node 134 and transmitted over the communication channel to the receiver. At the receiver, an analog pre-processing unit 142 receives the transmitted signal, which is processed and passed to a matched filter 144. The output of the matched filter 144 is then provided to an Analog/Digital (A/D) converter 146. Note that other modules may be implemented according to design and operational criteria. The components and elements of FIGS. 1A and 1B are provided for an understanding of the following discussion and are not intended to be a complete description of a communication system.

As discussed hereinabove, the sequence of symbols transmitted are identified as {y(n)}. For the present discussion, assume the symbols {y(n)} are normalized to have mean unit energy, i.e., E|y$_n$5|$^2$=1. If the channel output were filtered and sampled at the symbol rate (which may or may not be the Nyquist rate), the channel output is given as:

$$x_n = \sum_k h_k y_{n-k} + \eta_n \quad (0)$$

where $\eta_n$ is white Gaussian noise with variance $(E_s/N_0)^{-1}$. The equalizer is usually implemented as a linear filter with coefficients {f$_k$} and defined by a z-transform F(z). Let ŷ$_n$ denote the equalizer's output, wherein ŷ$_n$ is given as:

$$\hat{y}_n = \sum_k f_k x_{n-k} \quad (1)$$

$$= g_0 y_n + \left[\sum_{k>0} g_k y_{n-k} + \sum_{k>0} g_{-k} y_{n+k} + \eta'_n\right] \quad (2)$$

wherein G(z)=F(z)H(z) and $$\eta'_n = \sum_k f_k \eta_{n-k}. \quad (2a)$$

Note that the second term within square brackets, [ . . . ], of Equ. (2) represents the Inter-Symbol Interference (ISI) and noise. The first term of Equ. (2) corresponds to the interference associated with past symbols, while the second term corresponds to the interference associated with future symbols. The first term is often referred to as "causal" ISI, whereas the second term is often referred to as "anti-causal" ISI. If the designer assumes the past symbols are detected correctly, the causal ISI term may be removed. In an ideal case, if the equalizer has knowledge of the constellation symbols y$_{n-1}$,y$_{n-2}$, . . . , i.e., constellation symbols transmitted prior to time n, when determining the estimate ŷ$_n$, the equalizer can remove part of the inter-symbol interference by subtracting the first term of [ . . . ] of Equ. (2). In practical systems, however, the equalizer only has knowledge of the symbol estimates previously generated, such as ŷ$_{n-1}$, ŷ$_{n-2}$, . . . . If the interference and noise are small enough, it is reasonable to expect that symbol decisions on the estimate ŷ$_n$ will yield the original transmitted constellation symbol y$_n$. A device making such symbol decisions is referred to as a "slicer" and its operation is denoted by σ(.). The receiver could then form an estimate of the causal ISI using the sequence of symbol decisions from the slicer, and subtract this estimate from the equalizer's output to yield:

$$\hat{y}_n = \sum_k f_k x_{n-k} - \sum_{k>0} g_k \sigma(\hat{y}_{n-k}) \quad (2b)$$

$$= g_0 y_n + \left[\sum_{k>0} g_k (y_{n-k} - \sigma(\hat{y}_{n-k})) + \sum_{k>0} g_{-k} y_{n+k} + \eta'_n\right] \quad (2c)$$

$$\approx g_0 y_n + \left[\sum_{k>0} g_{-k} y_{n+k} + \eta'_n\right] \quad (3)$$

assuming σ(ŷ$_{n-k}$)≈y$_{n-k}$. This is the key principle of Decision Feedback Equalization wherein causal ISI is removed by causally filtering symbol decisions made by a symbol level slicer operating on the equalizer's output.

Figure 3:
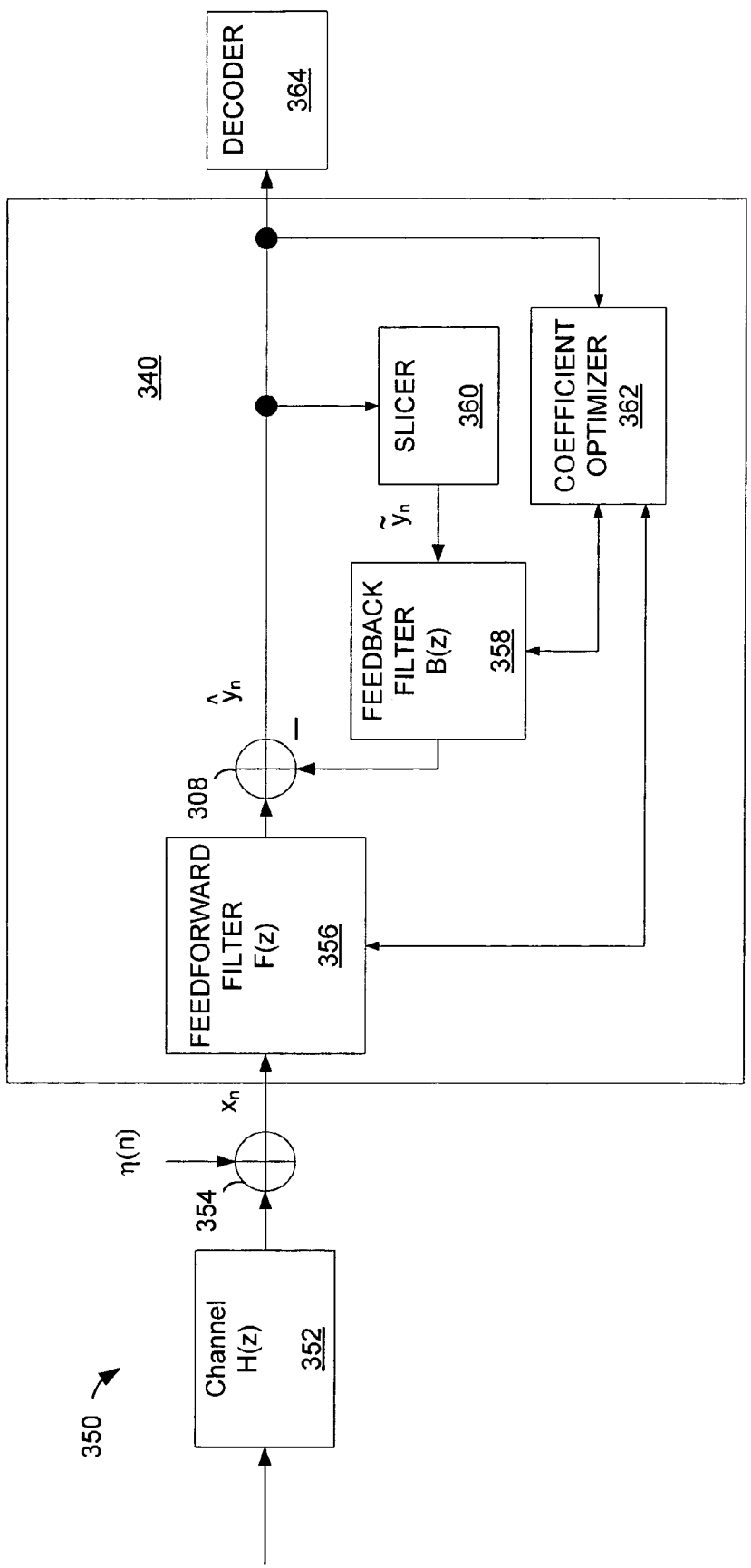
FIG. 3 is a block diagram of a decision-feedback equalizer as in FIG. 2.

FIG. 3 illustrates a communication system 350 employing a Decision Feedback Equalizer (DFE) 340. The communication system 350 is modeled as having an equivalent linear channel 352, which filters the sequence of symbols y$_n$. Noise and interference, η$_n$, is added at summing node 354, and the output, x$_n$, denotes the signal samples as received after front-end processing and sampling at the receiver. The DFE 340 processes x$_n$, and filters xn to generate the estimate ŷ$_n$. The DFE 340 is modeled as having a linear feedforward filter 356 and a linear feedback filter 358. The feedforward filter 356 has tap coefficients designated as {f$_k$} and implements the z-transform F(z). The DFE 340 also includes a purely causal feedback filter 358 coupled to a slicer 360 forming a feedback loop generating an estimate of causal ISI. In other words, the feedback filter 358 removes that part of the ISI from the present symbol estimate caused by previously detected symbols. The causal ISI estimate from the feedback filter 358 is provided to a summing node 308 which subtracts the causal ISI estimate from the output of the feedforward filter 356. The resultant output of the summing node 308 is the equalizer output ŷ$_n$. The equalizer output $\hat{y}_n$ is also an estimate of the transmitted symbol $y_n$ and is provided to decoder 364 for determining the original information sequence.

The slicer 360 processes the equalizer output from the summing node 308 and in response makes a decision as to the original symbol $y_n$. The output of the slicer 360 is then provided to the purely causal feedback filter 358. The feedforward filter 356 is also referred to herein as a Feed Forward Filter (FFF). The feedback filter 358 is also referred to herein as a Feed Back Filter (FBF). In a DFE, optimization of the filter coefficients, both feedforward filter 356 and feedback filter 358, directly affects performance of the equalizer. The device which performs this optimization is designed as Coefficient Optimizer 362 in FIG. 3. There are a variety of methods available for optimizing the filter coefficients. Traditionally, the FFF and FBF coefficients are optimized under the implicit assumption that the slicer's symbol decisions are perfectly reliable and that causal ISI, i.e., the interference from past symbols, is removed perfectly by the FBF. Under this assumption, the FFF coefficients are optimized such that the residual interference and noise term in Equ. (3) is small. More precisely, the z-transform of the FFF, F(z), is optimized so that $\hat{y}_n$ in Equ. (3) is close to $y_n$ in a mean-square sense.

In practice, the FFF and FBF are often implemented by Finite Impulse Response (FIR) filters and during an initial training/preamble/adaptation period, the FFF and FBF are "trained" on pilot symbols by assuming perfect slicer performance, i.e., $\sigma(\hat{y}_n)=y_n$. This is accomplished by by-passing the slicer and feeding back locally generated (and hence correct) pilot symbols, rather than sliced (hence possibly erroneous) pilot symbol decisions, into the FBF. A variety of algorithms may be implemented for filter coefficient optimization during the training period, including adaptive algorithms such as Least Mean Square (LMS), Recursive Least Squares (RLS), direct matrix inversion, as well as others. Once the training period is completed, the slicer 360 is engaged and the sliced data symbols are fed back through the FBF.

Conventional DFE optimization algorithms introduce a variety of potential problems. For systems employing strong coding, the slicer decisions often have a large Symbol Error Rate (SER). For example, an SER of 25% or more is not uncommon for a system employing a medium size constellation, such as 16-QAM, and a low rate turbo code, such as rate of ⅓, when operating at the 1% packet error rate point. On the other hand, the DFE's FFF and FBF coefficients are conventionally optimized under the incorrect assumption that the slicer's decisions are perfectly reliable.

Additionally, the FFF and FBF coefficients are optimized assuming the causal ISI is perfectly removed. As a result, the anti-causal ISI is reduced at the expense of greater causal ISI. Conventional DFE optimization algorithms, in terms of the equations provided herein (specifically, Equs. (1)–(3)), lead to $g_k$ values which tend to be large for k>0, but small for k<0. When the slicer SER is not negligible, however, erroneous symbol decisions infect the FBF and are thereafter subtracted incorrectly. When the $g_k$ values for k>0 are large, the residual interference is thus amplified, possibly resulting in further slicer errors on subsequent symbols. This phenomenon is called error propagation.

Attempts to mitigate error propagation include feeding back sliced pilot symbols during training, as opposed to training the FFF and FBF by feeding back locally generated (hence correct) pilot samples. The sliced pilot symbols are occasionally in error, forcing the FFF and FBF to adjust accordingly. This method is not without problems. The sliced pilot symbols and sliced data symbols may incur very different error rates as the pilot symbols are typically transmitted via BPSK, i.e., 2-PSK, (or another smaller constellation) but the data symbols are typically transmitted via a larger constellation. As a result, the SER of the pilot symbols and data symbols might be quite different. In this case, as the FFF and FBF coefficients are optimized based on the sliced pilot symbols, the effect of those coefficients in processing the data symbols results in suboptimal performance.

These problems are resolved by optimizing the FFF and FBF coefficients to account for errors caused by the slicer 360 of FIG. 3. In other words, the Coefficient Optimizer 362 is modified to recognize that the causal ISI may not be removed perfectly due to slicer errors. This approach differs from prior methods which implicitly assume the slicer is error-free and, therefore, that causal ISI is perfectly removed.

The theory behind one embodiment is to model the slicer operation by an independent, identically distributed (i.i.d.) "channel", labeled $Q(\tilde{y}|y)$. The "channel" is assumed independent of the noise process designated as $\{\eta_n\}$ in Equ. (0), and the transmitted symbol sequence designated as $\{y_n\}$. This "channel" is completely characterized by its conditional density $Q(\tilde{y}|y)$ where $\tilde{y}$ and y denote the slicer's output and the actual transmitted symbol, respectively. Assume such a channel is the cause of symbol errors in the FBF. In practice, symbol errors occur in bursts, because a slicer error on the current symbol implies following symbols may have an increased probability of being sliced incorrectly. In the simplified slicer model considered herein, the slicer errors are assumed i.i.d.

Figure 2:
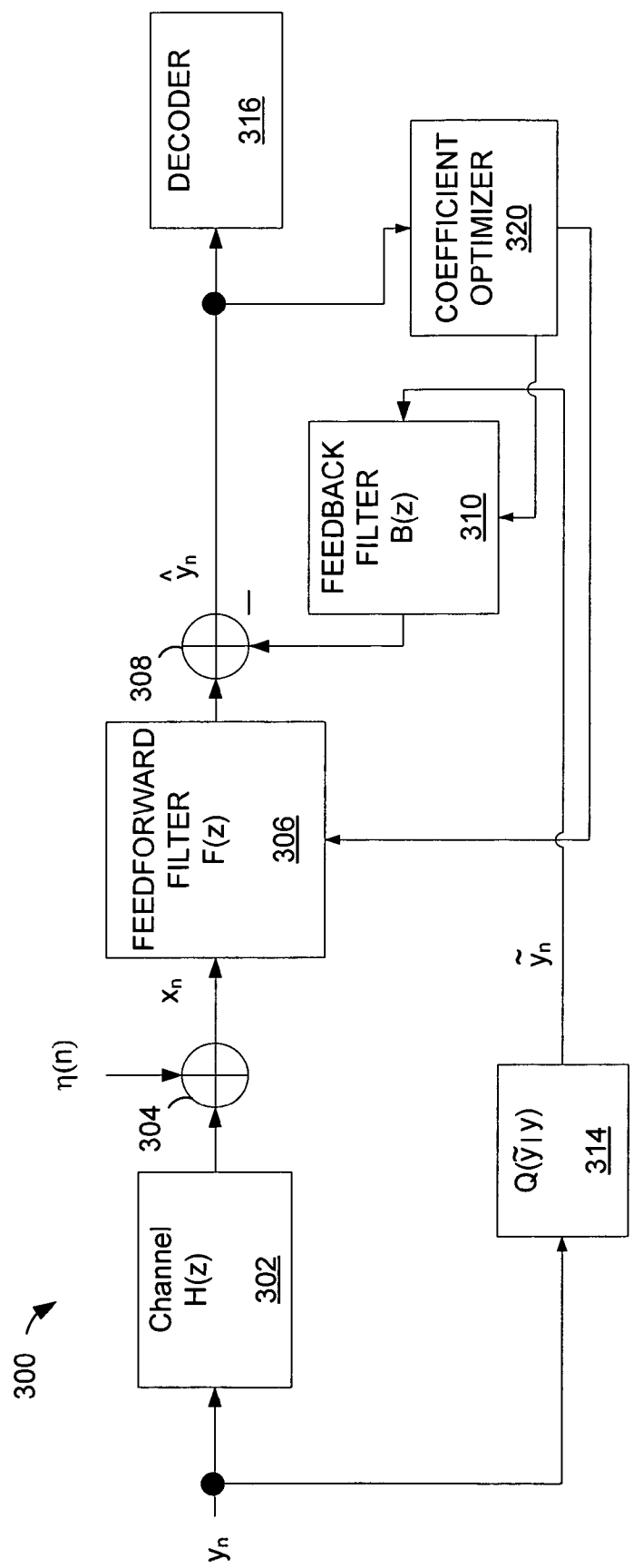
FIG. 2 is a conceptual model of a decision-feedback equalizer within a communication system.

FIG. 2 illustrates a conceptual model 300 of a communication system with a decision feedback equalizer. Symbols transmitted via the communication channel 302 modeled by transfer function H(z) are corrupted by additive noise at summing node 304. The resulting signal is filtered by FFF 306. An estimate of the original transmitted symbol is generated by subtracting an error term at summing node 308. The estimate of the original transmitted symbol is available for decoder 316. The error term is generated by a causal Feedback Filter 310, with transfer function B(z), which filters the outputs of "channel" $Q(\tilde{y}|y)$ 314. The error term generated by Feedback Filter 310 represents an estimate of the causal ISI present in the output of FFF 306. The "channel" $Q(\tilde{y}|y)$ mimics the statistical behavior of slicer 360 in FIG. 3, i.e., the statistical relationship between the input and output of channel 314 is identical to the statistical relationship between the transmitted symbol $y_n$ and the corresponding output $\tilde{y}_n=\sigma(\hat{y}_n)$ of slicer 360. The coefficient optimizer 320 is responsible for optimizing the filter coefficients for the FFF 306 and the FBF 310. Note that the main difference between FIG. 3 and FIG. 2 is the replacement of the slicer 360 with the conceptual model of "channel" $Q(\tilde{y}|y)$ 314.

As mentioned hereinabove, the slicer is modeled in FIG. 2 by selecting "channel" $Q(\tilde{y}|y)$ so as to model the statistical behavior of an actual slicer while ignoring the statistical dependence in time of slicer errors. As the actual slicer operates on the output of the equalizer, it follows that the relevant marginal statistics involve residual interference. Let SINR represent the Signal-to-Interference-and-Noise ratio at the output of the equalizer, i.e., at the output of summing node 308 in FIG. 2. Assume the residual interference and noise at the equalizer output may be modeled as a zero-mean complex Gaussian random variable Z with independent real and imaginary parts, each with variance $\sigma^2$, wherein:

$$\sigma^2 = \frac{1}{2(SINR)}. \quad (6)$$

Figure 4:
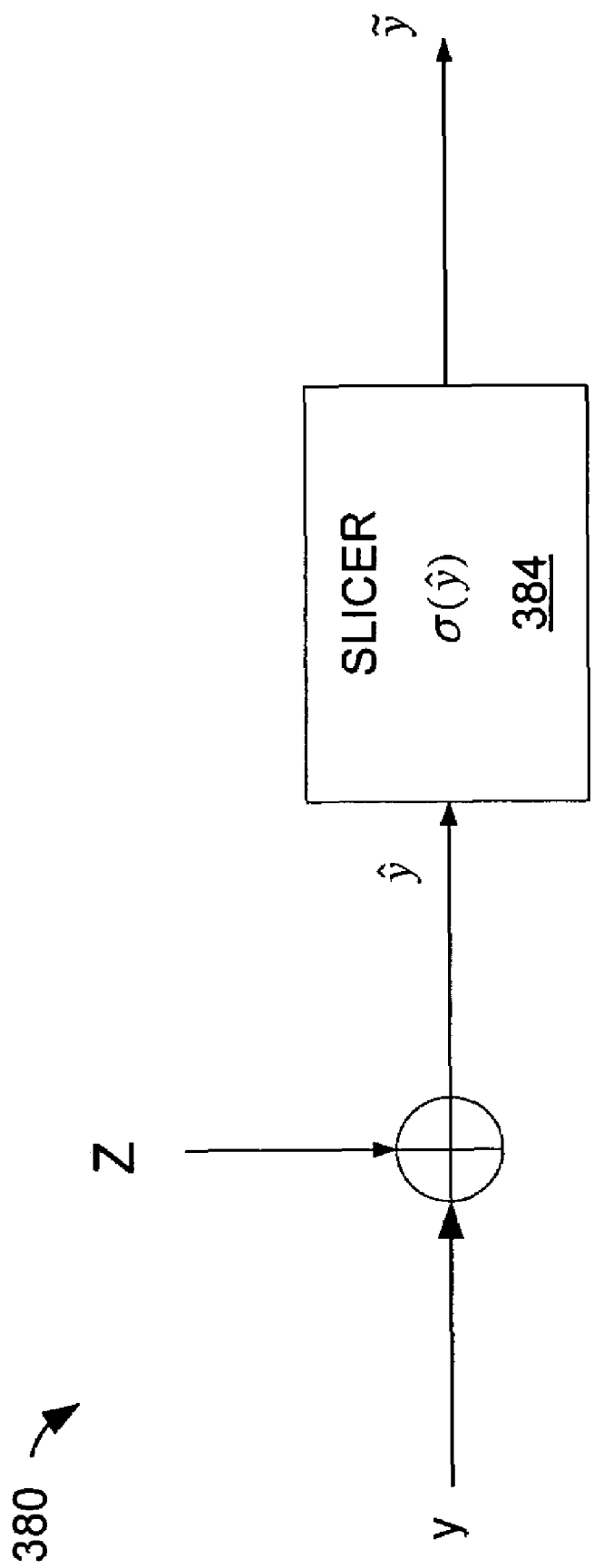
FIG. 4 is a mathematical model of a symbol level slicer.

The marginal statistics are given by the equivalent channel $Q(\tilde{y}|y)$, wherein:

$$Q(\tilde{y}|y) = Pr\{\sigma(y+Z) = \tilde{y}\}, \quad (7)$$

wherein $\sigma(\ )$ denotes a minimum distance slicing function given as:

$$\sigma(\hat{y}) = \arg\min_{y \in Y} \|\hat{y} - y\|^2 \quad (8)$$

and Z in Equ. (7) is the zero-mean complex Gaussian random variable, modeling residual interference with properties described hereinabove. FIG. 4 illustrates the channel $Q(\tilde{y}|y)$ modeled according to the assumptions and Equations provided hereinabove. Specifically, the mathematical description of $Q(\tilde{y}|y)$ 314 in FIG. 2 is illustrated as system 380. The input to the slicer 384 is denoted by $\hat{y}$ and is modeled as the transmitted symbol y, corrupted by additive noise and interference. The noise and interference is modeled by complex Gaussian random variable Z. The slicer 384 implements a minimum distance slicing function as, described in Equ. (8), resulting in slicer output marked $\tilde{y}$. The joint statistics connecting y and $\tilde{y}$ constitute the full mathematical description of the model for "channel" $Q(\tilde{y}|y)$. The construction of the channel $Q(\tilde{y}|y)$ illustrated in FIG. 4 is novel and differs from prior methods in that the noise Z may have a non-zero variance. Prior methods implicitly assume Z is identically equal to zero. Thus, this model for the slicer is assumed to make decision errors, in contrast to prior methods that assume the slicer is error-free.

Returning to FIG. 2, let $f_Q$ and $b_Q$ denote the FFF and FBF coefficients selected so as to minimize the mean square error between the transmitted symbol $y_n$ (the input of channel 302) and the symbol estimate $\hat{y}_n$ (the output of summing node 308). In other words, the coefficients $f_Q$ and $b_Q$ are "Wiener MMSE optimal". For reasons that will be made clear herein below, these coefficients are referred to as "Wiener Hybrid DFE" coefficients. The coefficients $f_Q$ and $b_Q$ may be determined by a standard Wiener-Hopf optimization and are defined by the following equation:

$$\begin{bmatrix} f_Q \\ b_Q \end{bmatrix} = \begin{bmatrix} R_F & \rho_Q R_{F,B} \\ \rho_Q^* R_{F,B}^H & R_B \end{bmatrix}^{-1} \begin{bmatrix} p_F \\ 0 \end{bmatrix}, \quad (4)$$

wherein $R_F$ denotes the covariance of the contents of the FFF, $R_B$ denotes the covariance of the contents of the FBF, $R_{F,B}$ denotes the cross-covariance of the contents of the FFF and the FBF, and $p_F$ denotes the cross-covariance between the contents of the FFF and the transmitted symbol. These covariances and cross-covariances depend on the linear channel 302 described by H(z). Assuming the symbols in Y, i.e., the transmit constellation, are used with equal probability, then $\rho_Q$ is defined as:

$$\rho_Q = \frac{1}{|Y|} \sum_{y \in Y} \sum_{\tilde{y} \in Y} [\tilde{y}^* \ y] Q(\tilde{y}|y) \quad (5)$$

wherein |Y| denotes the cardinality of Y, i.e., the number of possible symbols in the transmit constellation. Thus, for a given $Q(\tilde{y}|y)$ and channel with z-transform H(z), the MMSE coefficients $f_Q$ and $b_Q$ are determined by application of Equ. (4) and Equ. (5).

Recall that $Q(\tilde{y}|y)$ was defined according to Equ. (6) and Equ. (7) by hypothesizing a value of SINR at the equalizer output. Application of Equ. (4) and Equ. (5) then lead to MMSE coefficients $f_Q$ and $b_Q$. When these values for the FFF and FBF coefficients are used in the FFF 306 and FBF 310 in FIG. 2, the resulting SINR at the equalizer output may be different from the SINR value originally hypothesized. So the hypothesized SINR value may or may not be consistent. However, a consistent SINR value, and hence a consistent set of MMSE coefficients $f_Q$ and $b_Q$, can be found by iterating, i.e., by using the newly found SINR value to define a new "channel" $Q(\tilde{y}|y)$, finding a new set of corresponding MMSE coefficients, etc. This iterative process may be represented schematically as follows:

$$(SINR)^0 \rightarrow (f_0, b_0)^1 \rightarrow (SINR)^1 \rightarrow (f_1, b_1) \rightarrow (SINR)^2 \ldots$$

Figure 5:
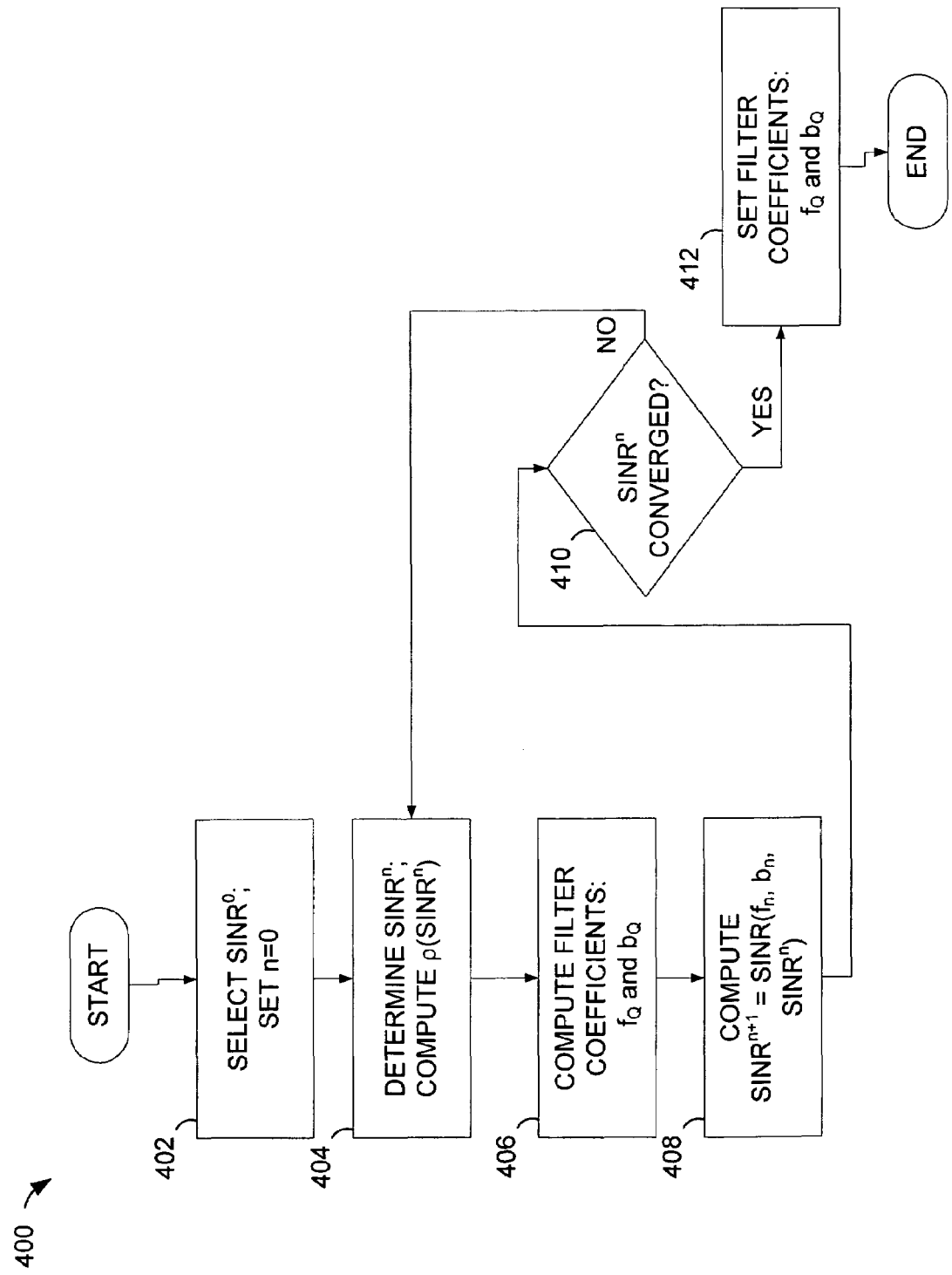
FIG. 5 is an algorithm for optimizing filter coefficients in a decision feedback equalizer.

In particular an iterative algorithm may be used for computing the Weiner Hybrid DFE. The algorithm of the present embodiment is illustrated in FIG. 5. The process 400 begins by setting n=0 at step 402 and selecting $SINR^0$ arbitrarily. The process continues by determining $SINR^n$ and computing $\rho(SINR^n)$ by applying Equs. (5), (6), and (7) at step 404. The filter coefficients $f_n, b_n$ are computed at step 406 by using Equ. (4). According to the present embodiment, the process computes $SINR^{n+1} = SINR(f_n, b_n, SINR^n)$ at step 408. Note that SINR(f,b,x) denotes the SINR at the output of the equalizer with FFF coefficients f, and FBF coefficients b, and a slicer channel Q(.|.) with SINR x. The slicer channel is defined by Equ. (6) and Equ. (7). If the process converges at decision diamond 410, processing continues to step 412 to set the filter coefficients. If the process has not converged, processing returns to step 404.

Note that as described in the iterative algorithm of FIG. 5, the value of $SINR^0$ may be chosen arbitrarily. The two extremes, $SINR^0=0$, $SINR^0=\infty$, correspond to starting with a totally unreliable slicer or a perfect slicer, respectively.

Note that $\rho$ represents the correlation between the slicer's output and the actual transmitted symbol, and as such, $\rho$ is a function of the equalizer's output SINR. If the equalizer's output is very noisy, the correlation is small. In this case, the slicer's symbol decisions are largely unreliable and an accurate estimate of the causal ISI is not possible. As expected, in this case, the algorithm of FIG. 5 converges to FFF and FBF coefficients which closely resemble those of a Linear Equalizer, i.e., one where the FBF coefficients are constrained to be zero. On the other hand, when the equalizer's output is nearly noiseless, the slicer's correlation $\rho$ tends to be close to one. In this case, the algorithm of FIG. 5 converges to FFF and FBF coefficients which closely resemble those of an "ideal" DFE, i.e., a DFE with a perfectly reliable slicer. In between these extremes, the algorithm of FIG. 5 converges to FFF and FBF coefficients which are a "hybrid" of these two limiting extremes. This "hybridization" is accomplished automatically by the iterative algorithm. For this reason, the FFF and FBF coefficients so obtained are referred to as "Hybrid DFE" coefficients.

The embodiment(s) described heretofore require explicit knowledge of the channel H(z) in order to construct the various covariances and cross-covariances of Equ. (4). The Wiener Hybrid FFF and FBF coefficients are then determined by solving Equ. (4) for $f_Q, b_Q$. In practice, however, H(z) is typically not known at the receiver, so an alternate method for determining the Wiener Hybrid DFE coefficients for the FFF and FBF is desirable. An alternate embodiment, referred to as the Adaptive Hybrid DFE, does not require explicit knowledge of the channel H(z). First, define the Mean Squared Error (MSE) as:

$$MSE = E|y_n - \hat{y}_n|^2 \qquad (9)$$
$$= E|y_n - f^H X_n - b^H(Z_n + \Delta_n)|^2$$

wherein $X_n$ are the contents of the FFF at time n, $Z_n$ are the FBF contents assuming error-free feedback, and $\Delta_n$ are feedback symbol errors introduced by the "channel" $Q(\tilde{y}|y)$. As the errors introduced by $Q(\tilde{y}|y)$ are assumed i.i.d. and independent, Equ. (9) may be written as:

$$MSE = E|y_n - f^H X_n - b^H Z_n|^2 + b^H E(\Delta_n \Delta_n^H) b \qquad (9a)$$
$$= E|y_n - f^H X_n - b^H Z_n|^2 + \|b\|^2 E_Q\|\tilde{y} - y\|^2$$

where $E_Q$ denotes "expectation" with respect to $Q(\tilde{y}|y)$. Using the fact that the transmit constellation is normalized to unit energy and the definition of $\rho_Q$ in Equ. (5), results in:

$$E_Q\|\tilde{y} - y\|^2 = E_Q\|y\|^2 + E_Q\|\tilde{y}\|^2 - 2E_Q\tilde{y}^* y \qquad (9b)$$
$$\approx 1 + \lambda_Q^2 - 2\rho_Q$$

where $$\lambda_Q^2 = \frac{1}{|Y|} \sum_{y \in Y} \sum_{\tilde{y} \in Y} |\tilde{y}|^2 Q(\tilde{y} | y).$$

Combining Equ. (9b) with Equ. (9a) results in:

$$MSE = E|y_n - f^H X_n - b^H Z_n|^2 + (1 + \lambda_Q^2 - 2\rho_Q)\|b\|^2 \qquad (9c)$$

Note that $\|b\|^2$ appearing in Equ. (9c) may be interpreted as the "energy" in the FBF coefficients. Equ. (9c) is the starting point for deriving a variety of adaptive algorithms. For example, to derive an adaptive algorithm based on the Recursive Least-Squares (RLS) method, a new cost function is defined by replacing the statistical expectation with a sample mean over, for example, n=1, . . . , N. Standard techniques are then applied to derive a recursive optimizer of this cost function. One embodiment implements a RLS optimizer of a cost function defined as follows:

$$MSE = \left[ \frac{1}{N} \sum_{n=1}^{N} |y_n - f^H X_n - b^H Z_n|^2 \right] + \alpha_Q \|b\|^2. \qquad (9d)$$

wherein:

$$\alpha_Q = 1 + \lambda_Q^2 - 2\rho_Q. \qquad (9e)$$

Note that $\alpha_Q$ may be referred to as a "modified measure of energy of the feedback filter coefficients" or an "error correction term." The RLS optimization may be performed on the pilot symbols present in the transmission.

Least Mean Square Algorithm: Another embodiment which optimizes Equ. (9c) is based on the Least Mean Square (LMS) algorithm. The Least Mean Square (LMS) algorithm recursively adjusts the FFF and FBF coefficients of the Hybrid DFE so as to minimize the MSE defined in Equ. (9c). For a fixed channel $Q(\tilde{y}|y)$, a Least Mean Squares (LMS) algorithm updates are given as:

$$f_{n+1} = f_n - \mu E^- \left\{ \frac{\partial MSE}{\partial f_n} \right\} \qquad (10a)$$

$$b_{n+1} = b_n - \mu E^- \left\{ \frac{\partial MSE}{\partial b_n} \right\} \qquad (10b)$$

wherein MSE is defined in Equ. (9c), $\mu$ is the LMS step-size and $E^-$ denotes dropping the statistical expectation in the definition of Equ. (9c). Calculating the partial derivatives results in:

$$f_{n+1} = f_n + \mu X_n e_n^*; \qquad (11)$$
$$b_{n+1} = (1 - \mu(1 + \lambda_Q^2 - 2\rho_Q))b_n + \mu Z_n e_n^*; \qquad (12)$$
$$= (1 - \mu \alpha_Q)b_n + \mu Z_n e_n^* \qquad (12a)$$
$$e_n = y_n - f_n^H X_n - b_n^H Z_n. \qquad (13)$$

When the value of $\mu$ is chosen suitably small, the sequence of iterations defined by Equ. (11) through Equ. (13) is stable and converges to the set of coefficients which solve Equ. (4). Notice that this sequence of iterations does not require explicitly estimating the covariances and cross-covariances in Equ. (4).

Figure 6:
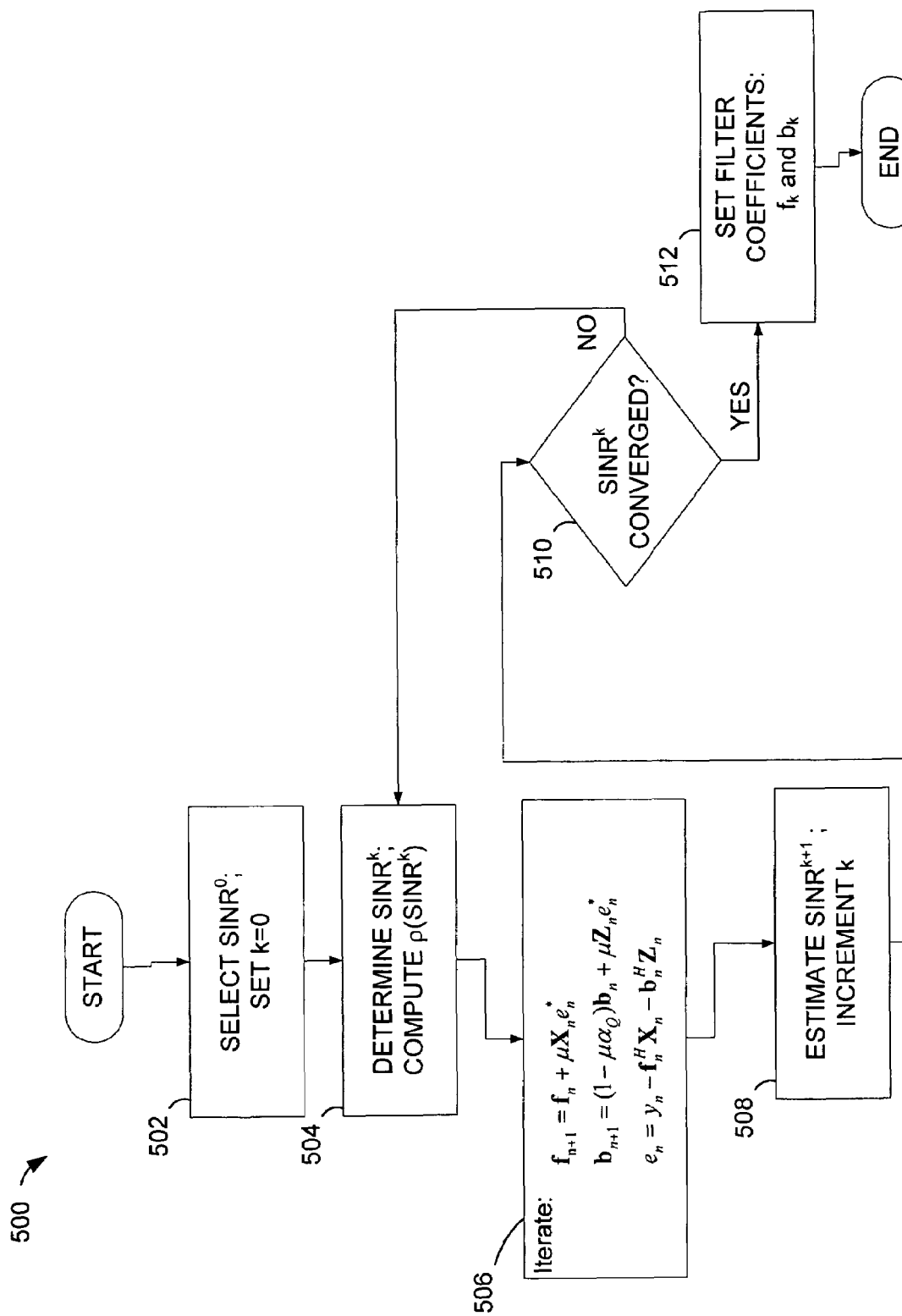
FIG. 6 is a Least Mean Square adaptive filtering algorithm for optimizing filter coefficients in a decision feedback equalizer.

FIG. 6 illustrates an LMS algorithm according to one embodiment. The algorithm 500 starts with selection of an initial $SINR^0$ value at step 502. Additionally, the index k is initialized as k=0. At step 504, the value of $SINR^k$ is estimated and $\rho(SINR^k)$ is calculated or determined from a pre-calculated Look-Up Table (LUT). Equ. (11) through Equ. (13) given hereinabove are calculated iteratively, based on the pilot symbols in the transmission, until a convergence criteria is met at step 510. The result of such iteration determines the values for $(f_k, b_k)$. At step 508 the process estimates $SINR^{k+1}$, which is the SINR at the equalizer output when the FFF and FBF coefficients are $(f_k, b_k)$. The estimation may be done using the pilot symbols in the transmission. The process then increments the index k. On convergence of $SINR^k$ at decision diamond 510, the process continues to step 512 to apply the filter coefficients. Else, processing returns to step 504.

Figure 7:
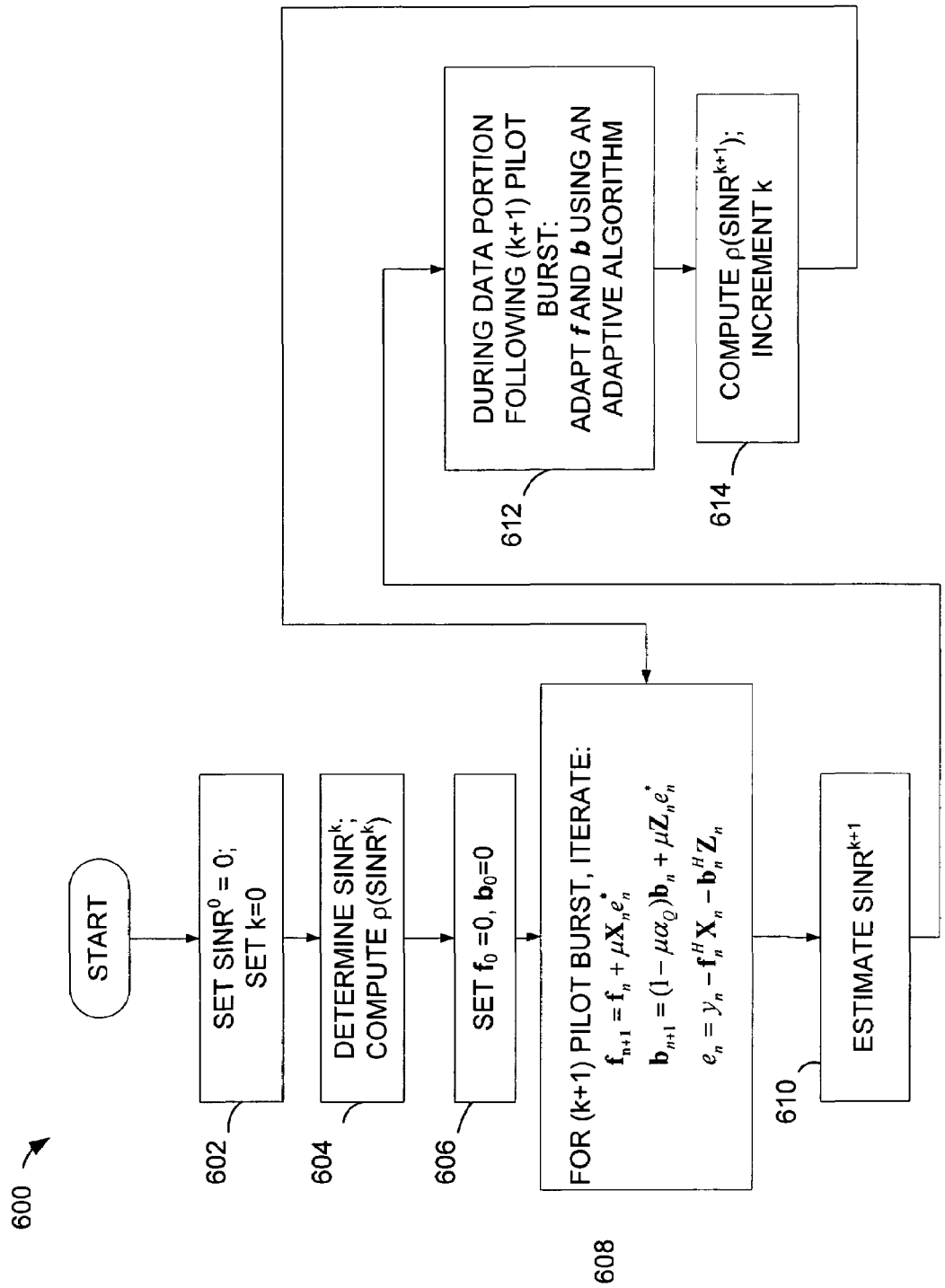
FIG. 7 is a Least Mean Square adaptive filtering algorithm for optimizing filter coefficients in a decision feedback equalizer for a system employing a periodic burst pilot.

Algorithm with Periodic Pilot Bursts: According to another embodiment, a communication system incorporates periodically transmitted pilot bursts which are used by receivers to adjust the filter coefficients in the receivers' equalizer. Such adjustment is often referred to as "training the equalizer". An example of such a system is a system supporting High Data Rate (HDR) as defined in "TIA/EIA-IS-856 CDMA2000 High Rate Packet Data Air Interface Specification" (the IS-856 standard). In an HDR system, 96 pilot symbols are transmitted every 0.833 ms. Each group of 96 pilot symbols is referred to as a "pilot burst". In between pilot bursts, the HDR system transmits data symbols intended for receivers. FIG. 7 illustrates an algorithm for applying an LMS-based hybrid DFE in such a system. The algorithm 600 initially sets up $SINR^0$ as equal to 0 or $\infty$ at step 602. The initial choice of SINR is not designated and may not be critical, though for the fastest convergence, $SINR^0$ equal $\infty$ to may be preferred. The index k is also initialized and set equal to 0. At step 604 the algorithm determines $SINR^k$, and computes $\rho(SINR^k)$ or determines the necessary value by consulting a pre-calculated Look-Up Table. The initial values for f and b are set as $f_0=0$ and $b_0=0$ at step 606. During the (k+1)-th pilot burst, the process iterates Equations (11) through (13) for all chips of the pilot burst, step 608. In the present HDR example, the algorithm 600 iterates for 96 chips of the pilot burst and the final values of f and b are saved. At step 610 the process estimates $SINR^{k+1}$, using the 96 chips of the preceding pilot burst. During the data portion following the (k+1) pilot burst, the saved values of f and b are loaded into the FFF and the FBF and the data symbols are equalized in standard decision-feedback fashion (step 612). At step 614 the process computes the value of $\rho(SINR^k)$ and increments k. The process continues to implement the algorithm during demodulation operations.

The algorithm of FIG. 7 is adaptive for slowly time-varying channels, as quasi steady state $SINR^k$, and therefore, $\rho(SINR^k)$, are not expected to vary much over the convergence time of the LMS algorithm.

Soft Slicer: As discussed hereinabove, error propagation significantly limits the use of DFEs in communication systems employing channel coding. Because the causal ISI is cancelled by feeding back decisions on individual symbols, a single isolated decision error may lead to a burst of subsequent decision errors, greatly enhancing the residual interference at the equalizer's output. If the channel code is strong, the probability of a symbol decision error is non-negligible (typically on the order of 25 percent) and error propagation may have serious effects on the performance of the DFE. One method of avoiding the effects incurred by such error propagation is to recognize that the usual "minimum distance" slicer attaches no confidence-level to symbol decisions. In other words, conventional slicer decisions provide no measure of the accuracy or correctness of symbol decisions. If a decision were known to be of questionable accuracy, it might be better to avoid canceling that symbol's contribution to the post-cursor tail, rather than risk compounding the residual interference by subtracting an incorrect decision. In other words, symbol decisions of low accuracy should not be included in the feedback loop canceling causal ISI.

One embodiment of a slicer that incorporates a confidence-level into the decision process will be referred to herein as a "soft slicer." One soft slicer is described by a mathematical model as explained hereinbelow. First, assume the input symbol to the slicer is given as:

$$\hat{y}=y+n \quad (14)$$

where y is the transmitted symbol belonging to the constellation $\Psi$ and n consists of residual noise and intersymbol interference. Assume that y is uniformly distributed over $\Psi$ so that all constellation points are transmitted with equal probability. Let $L(y,\tilde{y})$ be a loss function measuring the loss incurred when a slicer decides $\tilde{y}$ when the transmitted symbol is y. An optimum slicer $\sigma: \hat{y} \rightarrow \tilde{y}$, wherein "optimum" refers to a slicer which minimizes Expected loss, is given by Bayes Rule:

$$\sigma(\hat{Y}) = \arg\min_{\tilde{y}\in\Psi} E\{L(Y, \tilde{y}) \mid \hat{Y}\} \quad (15)$$

For the Minimum Error Probability (MEP) loss function given as:

$$L(y, \tilde{y}) = \begin{bmatrix} 0, y = \tilde{y} \\ 1, y \neq \tilde{y} \end{bmatrix} \quad (16)$$

the expected loss results in:

$$E\{L(Y, \tilde{y}) \mid \hat{Y}\} = Pr\{Y \neq \tilde{y} \mid \hat{Y}\} \quad (17)$$
$$= 1 - Pr\{Y = \tilde{y} \mid \hat{Y}\}$$

and therefore:

$$\sigma(\hat{Y}) = \arg\max_{\tilde{y}\in\Psi} Pr\{Y = \tilde{y} \mid \hat{Y}\} \quad (18)$$

Additionally, assuming the interference n is a Gaussian random variable with zero mean and variance $\sigma^2$, then:

$$\sigma(\hat{Y}) = \arg\min_{\tilde{y}\in\Psi} \|\hat{Y} - \tilde{y}\|^2 \quad (19)$$

independent of $\sigma^2$. This is a traditional "minimum distance" slicer, and although it is "Bayes-optimum" for the loss function of Equ. (16), the slicer may lead to error propagation for the reasons discussed hereinabove. An alternate slicer design considers the quadratic loss function:

$$L(y,\tilde{y})=\|y-\tilde{y}\|^2 \quad (20)$$

which, unlike the MEP loss function, penalizes larger errors more significantly than smaller errors. Following from Equ. (15):

$$\sigma(\hat{Y}) = \arg\min_{\tilde{y}\in\Psi} E\{\|Y - \tilde{y}\|^2 \mid \hat{Y}\} \quad (21)$$

-continued $$= E\{Y \mid \hat{Y}\}$$

and the conditional mean equals:

$$\sigma(\hat{Y}) = \sum_{y \in \Psi} y \left[ \frac{e^{-\frac{\|\hat{Y}-y\|^2}{2\sigma^2}}}{\sum_{y \in \Psi} e^{-\frac{\|\hat{Y}-y\|^2}{2\sigma^2}}} \right] \quad (22)$$

An important observation is that unlike the slicer of Equ. (19), the slicer of Equ. (22) requires an estimate of the interference and noise variance $\sigma^2$ (e.g., $\sigma^2=\frac{1}{2}$(SINR)).

Note also that the slicer of Equ. (22) corresponds to the centroid of the a posteriori distribution on the constellation symbols, i.e., the centroid of the term in square brackets [ . . . ] in Equ. (22). Thus if $\sigma^2$ is large, the assumption of a uniform prior distribution on a symmetric constellation implies a nearly uniform posterior distribution, and hence the centroid is near zero. On the other hand, when $\sigma^2$ is small, the posterior distribution has its mass concentrated on the actual transmitted symbol and its neighboring constellation points; the centroid is therefore, close to the transmitted symbol. The slicer in Equ. (22) is thus referred to as a "soft slicer".

The soft slicer can be used in the adaptive Hybrid DFE with minimum modification. The FFF and FBF coefficients are chosen to optimize the following definition of MSE:

$$MSE = E|y_n - f^H X_n - b^H Z_n|^2 + (1 + 2\rho_Q - \lambda_Q^2)\|b\|^2. \quad (23)$$

$$MSE = E|y_n - f^H X_n - b^H Z_n|^2 + (1 - 2\rho_Q + \lambda_Q^2)\|b\|^2 \quad (23)$$

where $$\rho_Q = E_Q\{\tilde{Y}^* Y\} \quad (24a)$$

similar to Equ. (5), and $\lambda_Q^2$ is defined as:

$$\lambda_Q^2 = E_Q\{|\tilde{Y}|^2\} \quad (24b)$$

The "channel" $Q(\tilde{y}|y)$ is defined as:

$$Q(\tilde{y}|y) = Pr\{\sigma(y+Z) = \tilde{y}\} \quad (25)$$

wherein $\sigma(.)$ represents the soft-slicer defined in Equ. (22) and Z is complex gaussian noise defined in exactly the same way as in Equ. (7). Following an analogous development of the optimization scheme based on the LMS algorithm, we find Equs. (11), (12) and (13) unchanged, except that for the fact that $\alpha_Q = 1 + \lambda_Q^2 - 2\rho_Q$ is computed based on Equs. (24a), (24b) and the soft-slicer defined in Equ. (25). As before, the leakage factor $(1 - 2\rho_Q + \lambda_Q^2)$ is SINR dependent and may be determined by a table lookup.

The LMS-based algorithm as described hereinabove requires no additional changes. During the pilot/training portion of the slot, the adaptation is performed as before; during the data portion of the slot, the conditional mean slicer is used in place of the "hard", minimum-distance slicer.

The computations involved in the soft slicer, namely Equ. (22), may be too complicated for some practical implementations. One embodiment simplifies the slicer design so as to restrict the slicer output to take on at most N values. Equivalently, this amounts to restricting the slicer input to take on at most N values. In other words, the slicer input $\hat{Y}$ is quantized to one of N points using a quantizer defined by: Q: $\hat{Y} \rightarrow \{\hat{Y}_1, \ldots, \hat{Y}_N\}$. Then for K=1, . . . , N, $\sigma(\hat{Y})$ is computed as:

$$\sigma(\hat{Y}) = \sigma_k, \text{ if } Q(\hat{Y}) = \hat{Y}_k \quad (26)$$

wherein:

$$\sigma_k = E\{Y | \hat{Y} \epsilon Q^{-1}(\hat{Y}_k)\}. \quad (27)$$

The quantized slicer's operation can be summarized as: 1) quantize $\hat{Y}$ to one of N possible values; and 2) use this value and knowledge of the SINR as indices in a lookup table to determine $\tilde{Y} = \sigma(\hat{Y})$. Since the complexity in this design lies in step 1), a further simplification would be to restrict $\hat{Y}_1, \ldots, \hat{Y}_N$ to lie on a uniform square grid and then quantize $\hat{Y}$ by quantizing its Real and Imaginary parts separately, using a "nearest neighbor" criterion. Such a slicer function may be implemented with simple logic, i.e., by first computing the nearest set of neighbors based on $\hat{Y}$'s Real-coordinate, then computing the nearest neighbor in this subset based on $\hat{Y}$'s Imaginary-coordinate. Additionally, the lookup table may be fairly coarse in SINR, with 1 dB steps sufficient for most implementations. For example, given $\{\sigma_k\}$ lookup tables for SINR=5 dB and SINR=6 dB, the appropriate $\sigma_k$ values for an intermediate SINR value of say, 5.4 dB, may be determined by suitably interpolating between the two LUTs. In other words, the appropriate $\sigma_k$ values at intermediate SINR values may be generated within the slicer device, thus reducing the necessary memory/storage requirements.

As an illustration of the application of a soft slicer to a Hybrid DFE (HDFE), consider FIGS. 8A and 8B. FIG. 8A illustrates an 8-PSK constellation, wherein 8 complex symbols represent the 3 encoded bits mapped for modulation. As illustrated, the circles represent the constellation points used for modulation at the transmitter. The "x" marks indicate the samples as received at the receiver and include noise and interference introduced during transmission. Note that the received samples do not necessarily match the actual constellation symbols. In this case, the receiver decides which constellation symbol was actually sent. Typically, the received points are concentrated around the actual transmitted constellation symbols.

One method of determining the transmitted symbol from the received samples is to divide the constellation map into pie slices, as illustrated in FIG. 8B. Here the constellation map is divided into 8 slices, 702, 704, 706, 708, 710, 712, 714, and 716. The slices are determined, for example, in accordance with a minimum distance metric, which uses the Euclidean distance or separation between two constellation points to select a boundary. A problem exists when the received sample is approximately equidistant (i.e., approximately on the boundary) between two constellation points. In this case, if the decision process were to select the wrong constellation symbol, this error would be propagated in the feedback loop of a DFE. To avoid such errors and the associated amplification in a DFE, a soft slicer is applied that outputs a value not necessarily at a constellation symbol. The soft slicer implicitly determines a confidence level from the received samples. The confidence level provides the system with guidance in evaluating the sample. If the confidence level is low, i.e., an error is likely, the sample is not emphasized in the feedback portion of the equalizer. If the confidence level is high, the sample is considered reliable, and therefore, a suitable symbol estimate derived therefrom may be used in the feedback portion of the equalizer.

FIG. 9A illustrates a 2-PSK constellation map. Note that decisions made based on the minimum distance from a constellation symbol may result in errors for received samples such as that marked by the "x." Application of a soft slicer according to one embodiment, divides the constellation map into rectangles as illustrated in FIG. 9B. As plotted, the rectangles, such as rectangle 720, are semi-infinite in the y-direction and not all rectangles encompass constellation symbols. When the slicer's input sample falls within one of the semi-infinite rectangles, a conditional mean value is assigned. Effectively all points within the rectangle are mapped to a common value. This value represents the conditional mean of the transmitted symbol, given the slicer's input sample falls within the rectangle of interest. The mapping of each rectangle to a corresponding conditional mean value is a function of the Signal to Interference and Noise Ratio (SINR). For example, a given rectangle may map to $\sigma$ for SINR at a first level, e.g., SINR=4 dB. The same rectangle may map to $\sigma'$ for SINR at a second level, e.g., SINR=5 dB. The mapping and associated conditional mean values are stored in lookup tables for easy retrieval. An alternate embodiment calculates the conditional mean value according to a predetermined algorithm. Note that a square or rectangular grid is easily implemented and extensible to more complex constellations.

Figure 10:
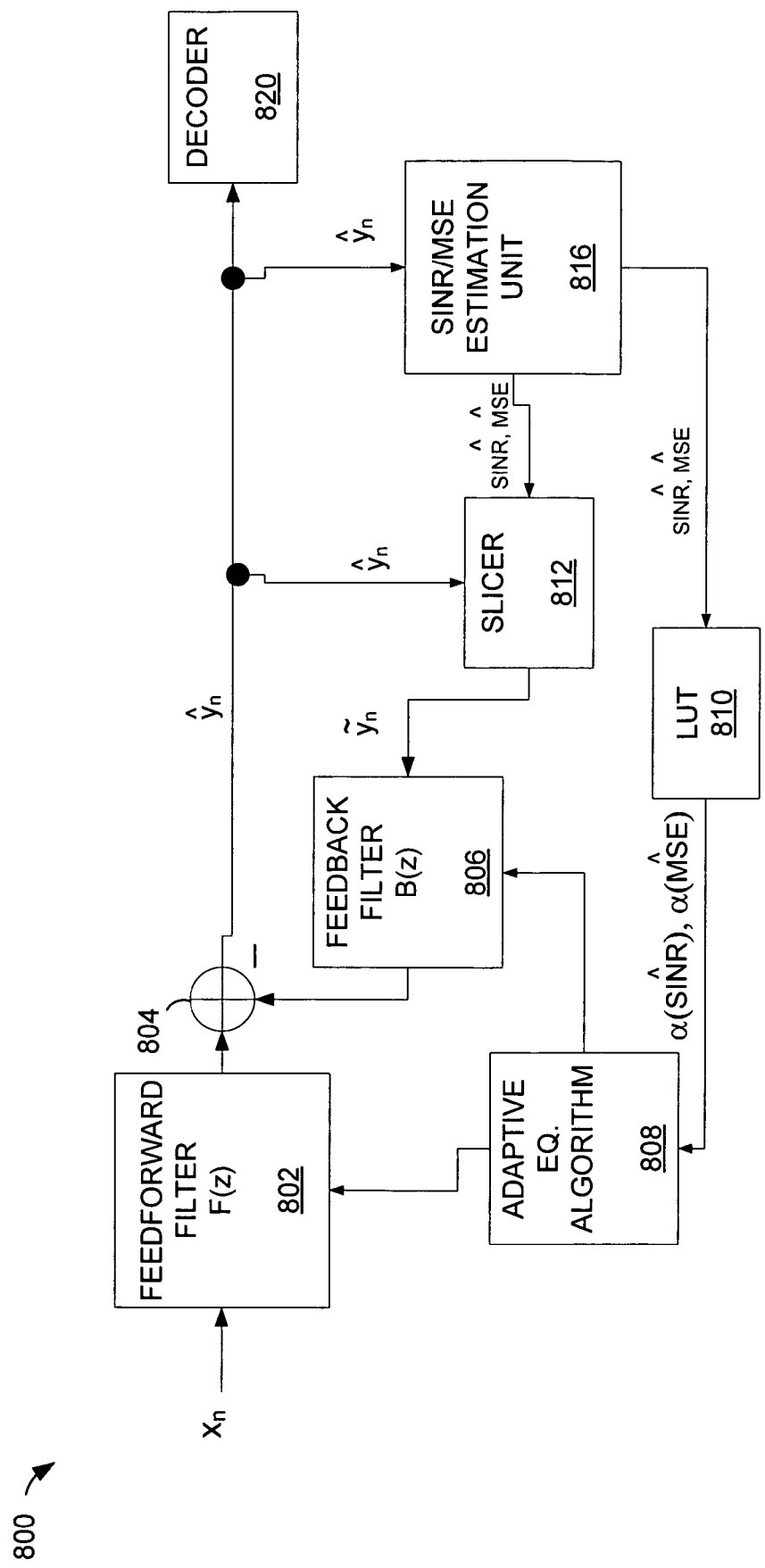
FIG. 10 is a decision-feedback equalizer implementing a "soft slicing" decision process.

FIG. 10 illustrates an Equalizer 800 using a soft slicer. The Equalizer 800 includes an FFF 802 coupled to a summing node 804. The FFF 802 is controlled by an adaptive equalization algorithm 808. The adaptive control unit 808 is responsive to an SINR estimation unit 816. In an alternate embodiment, the SINR estimation unit 816 may be implemented as an MSE estimation unit. The SINR estimation unit 816 provides an SINR estimate to a lookup table (LUT) 810. The SINR estimate is used in conjunction with the values stored in LUT 810 to determine $\alpha_Q(\text{SINR})=1+\lambda_Q^2-2\rho_Q$ defined according to Equs. (24a), (24b) and (25). The adaptive equalization algorithm 808 uses the $\alpha_Q$ value produced from LUT 810 to update the coefficients of the FFF 802 and the FBF 806, by iterating Equs. (11), (12) and (13). Recall that Equs. (11), (12) and (13) were based on the LMS algorithm and designed to optimize the MSE cost function defined in Equ. (23). In an alternate embodiment, the adaptive equalization algorithm 808 may implement another adaptive filtering algorithm, such as RLS, to optimize the MSE cost function defined in Equ. (23). The FBF 806 outputs an estimate of the causal ISI present in the output of the FFF 802. The FBF 806 output is coupled to summing node 804 where it is subtracted from the output of FFF 802. The output of summing node 804, i.e., the estimate of transmitted symbol, is then provided to a decoder 820, the SINR/MSE estimation unit 816, and to the soft slicer 812. The soft slicer 812 receives the SINR/MSE estimate from the SINR/MSE estimation unit 816 and generates a further estimate of the transmitted symbol, and outputs this further symbol estimate for filtering in FBF 806.

Figure 11:
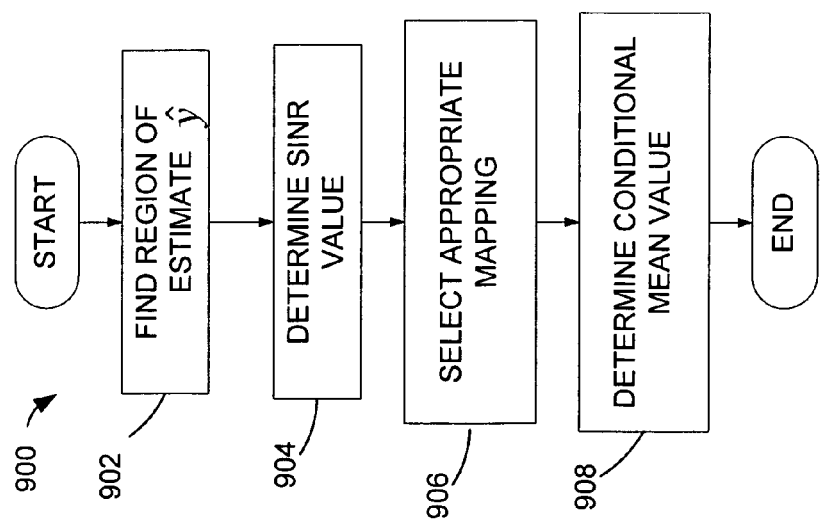
FIG. 11 is a process for a "soft slicing" decision process.

FIG. 11 is a flow chart of a soft slicer process incorporating a soft slicer according to one embodiment. The process first determines a region, such as a grid square or rectangle on the constellation map, corresponding to a quantization of the slicer input sample ŷ, at step 902. A determination is made of the SINR value at step 904. At step 906, the process selects an appropriate mapping as a function of the SINR value. According to one embodiment, separate portions of a memory storage device store separate look up tables. The tables are accessed according to SINR value. At step 908 a conditional mean value is determined from the appropriate mapping and this is the slicer output.

Figure 12:
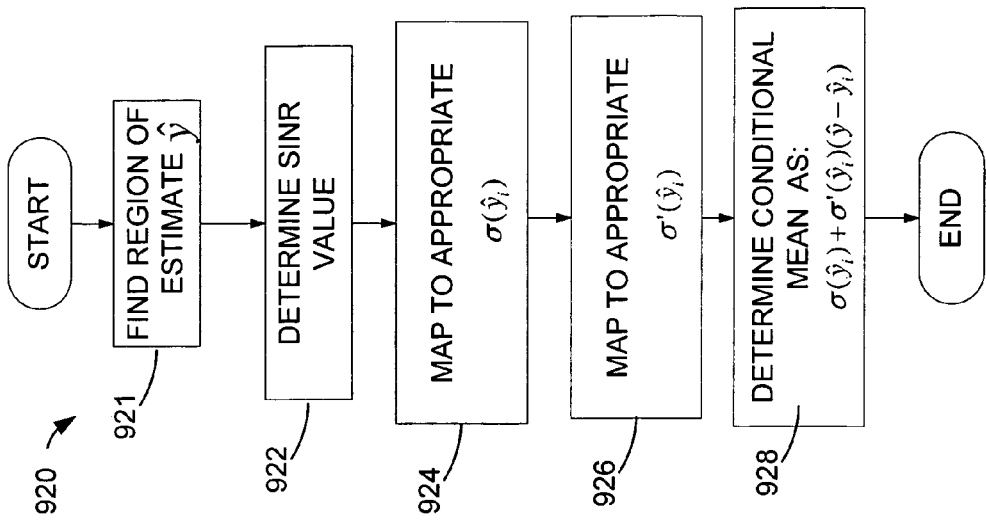
FIG. 12 is a process for a "soft slicing" decision process applying a Taylor series computation.

Another soft slicer embodiment applies a square grid to the constellation map, and uses a Taylor expansion to generate a more accurate conditional mean value. In this embodiment, multiple smaller lookup tables store values corresponding to each SINR value. The process 920 is illustrated in FIG. 12. The region of the soft slicer input ŷ is determined at step 921. At step 922 an SINR value is determined. The SINR value is used to determine appropriate mappings $\sigma_1(.)$ and $\sigma_2(.)$ at step 924. The region of step 920 is mapped to a value $\sigma_1(\hat{y}_i)$, wherein i corresponds to the region. A second mapping is then performed at step 926 consistent with the SINR value and the region of step 920 to obtain $\sigma_2(\hat{y}_i)$. A conditional mean value is approximated at step 928 as $\sigma_1(\hat{y}_i)+(\hat{y}-\hat{y}_i)\sigma_2(\hat{y}_i)$. The mappings $\sigma_1(.)$ and $\sigma_2(.)$ are closely related to the zero-th and first derivatives of $\sigma(.)$ defined in Equ. (22).

Figure 13:
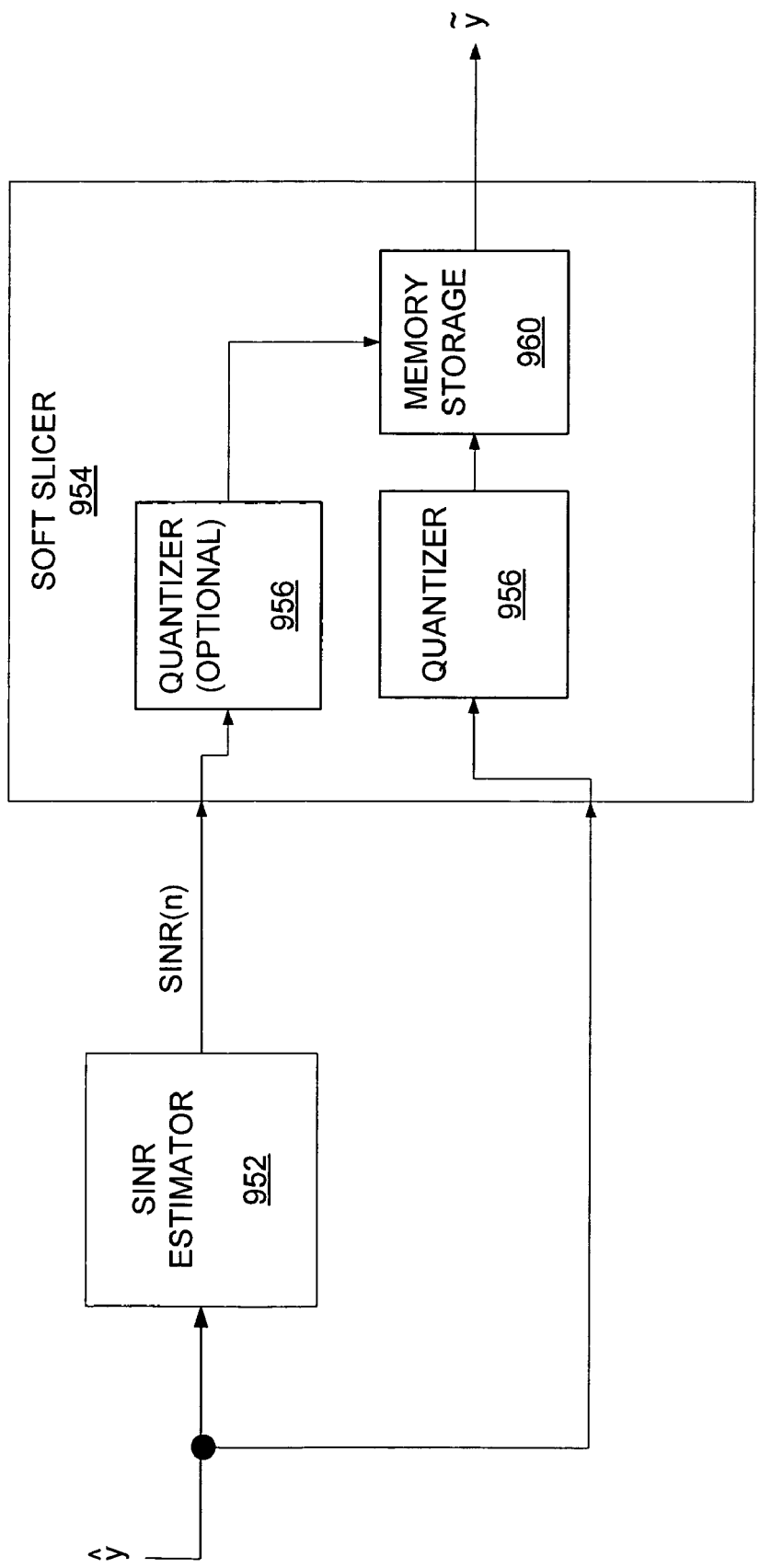
FIG. 13 is a block diagram of a "soft slicer."
Figure 14:
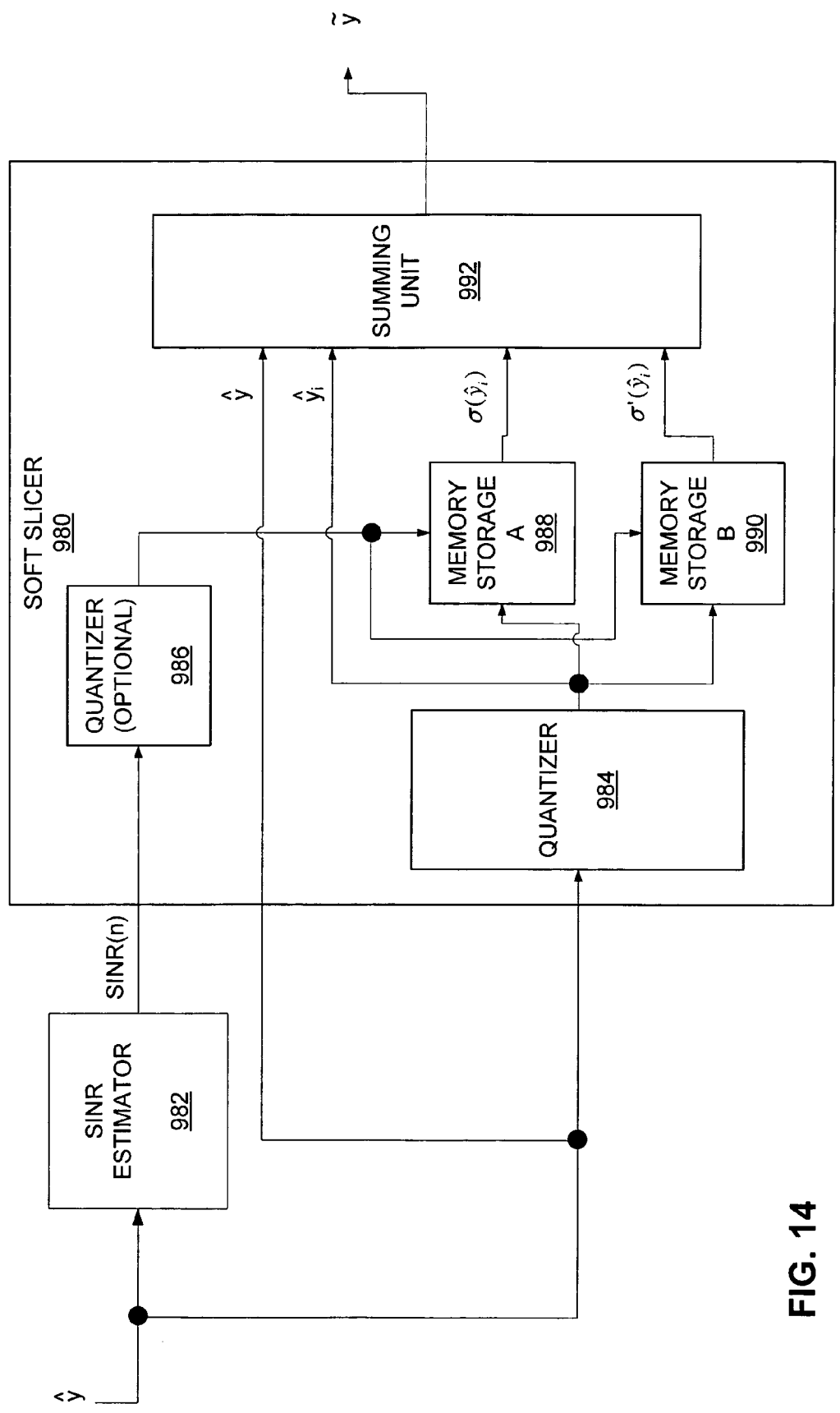
FIG. 14 is a block diagram of a "soft slicer" applying a Taylor series computation.

FIG. 13 illustrates a soft slicer 954 according to one embodiment. An SINR estimator 952 receives one or more symbol estimates and outputs an SINR estimate value SINR(n). The SINR(n) may be quantized in an optional quantizer 956, and is provided to memory storage 960, such as a LUT. A symbol estimate corresponding to the soft slicer input is also provided to a quantizer 956, wherein the symbol estimate is quantized and the quantized value is used in conjunction with the SINR estimate to determine a corresponding value stored in the memory storage 960. Note that in one embodiment, the information is stored in rows and columns, wherein the rows correspond to SINR values and the columns correspond to symbol values. Alternate embodiments, however, may store the information in any of a variety of ways, wherein the information is retrievable based on an SINR value and a symbol value. The values stored in the memory storage 960 may be the conditional mean of actual constellation symbol, given the soft slicer input estimate, such as defined in Equs. (22), (26) and. (27). FIG. 14 illustrates a soft slicer 980 according to an alternate embodiment implementing a Taylor series computation. As illustrated, one or more received symbols are provided to an SINR estimator 982 and one symbol estimate, corresponding to the soft slicer input, is also provided directly to the soft slicer 980. Note that the received symbols are corrupted by the transmission channel and therefore are herein also referred to as received "samples." The SINR estimator 982 provides an SINR estimate SINR(n) to the soft slicer 980. The SINR(n) may be provided to an optional quantizer 986. The SINR(n), quantized or not, is provided to two memory storage units, A 988 and B 990. The soft slicer input symbol estimate is provided to a quantizer 984, the output of which is also provided to the memory storage units A 988 and B 990. The memory storage units A 988 and B 990 store information used to compute the conditional mean values of the actual constellation symbol, given the soft slicer input symbol estimate. Such values may be the zero-th and first derivatives of the conditional mean of the actual constellation symbol, given the soft slicer input symbol estimate, such as given in Equs. (22), (26) and Equ. (27). The SINR(n) value and the quantized symbol value are used to identify the corresponding values in memory storage A 988 and B 990. A summing unit 992 is used to implement the Taylor series computation. The soft slicer input symbol estimate, as well as the quantized value are provided to the summing unit 992.

In addition, the values stored in the memory storage units A 988 and B 990 are also provided to summing unit 992. The summing unit 992 uses the inputs to compute an output that is a conditional mean estimate of the actual constellation symbol. While the present invention has been described with respect to a wireless communication system, such a system is provided merely as an example. The concepts described herein are applicable in a variety of communication systems, including, but not limited to wireline communication system, such as implementation in a wireline modem, etc. The present invention is applicable in a high data rate communication system, and allows optimization of resources and capacity in a data communication system by increasing receiver sensitivity and increasing the communication data rate. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for estimating a transmitted symbol, the transmitted symbol being mapped to a constellation map, the method comprising:
   receiving a sample;
   estimating Signal-to-Interference-and-Noise Ratio (SINR) of the sample;
   estimating the transmitted symbol based on the SINR and the sample, wherein estimating the transmitted symbol comprises:
   calculating the variance of the received sample defined by the relationship:

$$\sigma^2 = \frac{1}{2(SINR)},$$

and evaluating a conditional mean as:

$$\sigma(\hat{Y}) = \sum_{y \in \Psi} y \left[ \frac{e^{-\frac{\|\hat{Y}-y\|^2}{2\sigma^2}}}{\sum_{y \in \Psi} e^{-\frac{\|\hat{Y}-y\|^2}{2\sigma^2}}} \right]$$

wherein $\hat{Y}$ represents the input sample to the soft slicer and y represents the transmitted symbols belonging to the constellation mapping $\Psi$.

2. A method for estimating a transmitted symbol, the transmitted symbol being mapped to a constellation map, the method comprising:
   receiving a sample;
   estimating Signal-to-Interference-and-Noise Ratio (SINR) of the sample;
   estimating the transmitted symbol based on the SINR and the sample, wherein estimate values are stored in a memory storage unit, and wherein each region of the constellation map has a corresponding estimate value;
   quantizing the symbol to a generate a first value to a region of the constellation map; and
   determining an estimate value corresponding to the region of the constellation map.

3. The method as in claim 2, further comprising:
   quantizing the symbol to a first value selected from a set of N values; and
   determining an entry of the memory storage unit corresponding to the first value and the SINR.

4. The method as in claim 3, wherein quantizing the symbol comprises:
   quantizing the symbol using a Minimum Euclidean Distance criterion.

5. The method as in claim 2, wherein the estimate values are stored in the memory storage unit for a set of SINR values, and wherein the method further comprises:
   interpolating entries in the memory storage unit to determine a first estimate value for a first SINR value, wherein the first SINR value is not in the set of SINR values.

6. The method as in claim 2, wherein each region is a rectangle.

7. The method as in claim 2, wherein the memory storage unit includes entries identified by SINR and estimate value.

8. A method for estimating a transmitted symbol, the transmitted symbol being mapped to a constellation map, the method comprising:
   receiving a sample;
   estimating Signal-to-Interference-and-Noise Ratio (SINR) of the sample;
   estimating the transmitted symbol based on the SINR and the sample;
   determining a first estimate based on the SINR and the received sample; and
   determining a second estimate based on a combination of the first estimate, the SINR, and the received sample, wherein the first estimate is defined as:

$$\sigma_1(\hat{y}_i),$$

and the second estimate is given as:

$$\sigma_1(\hat{y}_i)+(\hat{y}-\hat{y}_i)\sigma_2(\hat{y}_i),$$

wherein each $\sigma$ represents a unique mapping of a sample value to an estimate value, $\hat{y}$ represents the received sample, and $\hat{y}_i$ is a quantized version of the received sample.

9. The method as in claim 8, wherein the first estimate is calculated using a minimum distance slicer.

10. The method as in claim 8, wherein the second estimate is equal to the first estimate plus a correction term.

11. The method in claim 8, wherein determining the first estimate comprises quantizing the received sample to form a quantized sample; generating a first estimate based on the quantized sample; and generating a second estimate based on the first estimate.

12. A method for determining filter coefficients in a decision-feedback equalizer, the decision-feedback equalizer having a feedforward filter and a feedback filter each defined by a plurality of coefficients, the method comprising:
   selecting a cost function for the decision-feedback equalizer, the cost function is the Mean Squared Error (MSE) between an equalizer output assuming error-free feedback and a target equalizer output plus a modified measure of energy of the feedback filter coefficients; and
   adjusting the plurality of coefficients until a convergence condition is met, wherein the convergence condition is to minimize the cost function wherein the MSE is given as:

$$MSE = \left[\frac{1}{N}\sum_{n=1}^{N}|y_n - \mathbf{f}^H\mathbf{X}_n - \mathbf{b}^H\mathbf{Z}_n|^2\right] + \alpha\|\mathbf{b}\|^2$$

wherein $y_n$ is a received symbol, N corresponds to a number of points in the mapping constellation, $\mathbf{X}_n$ are the contents of the feedforward filter at time n, $\mathbf{Z}_n$ are the feedback filter contents assuming error-free feedback, f are filter coefficients for the feedforward filter, b are filter coefficients for the feedback filter, and $\alpha_Q$ is the modified measure of energy of the feedback filter coefficients,
wherein the modified measure $\alpha_Q$ is defined as:

$$\alpha_Q = 1 + \lambda_Q^2 - 2\rho_Q$$

wherein:

$$\rho_Q = \frac{1}{|Y|}\sum_{y \in Y}\sum_{\tilde{y} \in Y}\tilde{y}^* Q(\tilde{y}|y)y, \text{ and}$$

wherein:

$$\lambda_Q^2 = \frac{1}{|Y|}\sum_{y \in Y}\sum_{\tilde{y} \in Y}|\tilde{y}|^2 Q(\tilde{y}|y), \text{ and}$$

wherein $Q(\tilde{y}|y)$ is a slicer channel model, $\tilde{y}$ is a slicer output, y is a slicer input, wherein a slicer channel model is defined as:

$$Q(\tilde{y}|y) = Pr\{\sigma(y+Z) = \tilde{y}\}$$

wherein $\sigma(.)$ denotes a soft slicing function, Z is a zero mean Gaussian random variable wherein the variance is defined by the relationship:

$$\sigma^2 = \frac{1}{2(SINR)}, \text{ and}$$

wherein residual interference and noise are modeled as a zero-mean complex Gaussian random variable Z with independent real and imaginary parts, each with variance $\sigma^2$.

13. An apparatus for estimating a transmitted symbol, the transmitted symbol being points in a constellation, the method comprising:
   means for receiving a sample;
   means for estimating Signal-to-Noise Ratio (SINR) of the sample;
   means for estimating the transmitted symbol based on the SINR and the sample, wherein the means for estimating the transmitted symbol further comprises:
   means for calculating the variance of the received sample defined by the relationship:

$$\sigma^2 = \frac{1}{2(SINR)}$$

wherein residual interference and noise are modeled as a zero-mean complex Gaussian random variable Z with independent real and imaginary parts, each with variance $\sigma^2$ and evaluating a conditional mean as:

$$\sigma(\hat{Y}) = \sum_{y \in \Psi} y \left[\frac{e^{\frac{\|\hat{Y}-y\|^2}{2\sigma^2}}}{\sum_{y \in \Psi} e^{\frac{\|\hat{Y}-y\|^2}{2\sigma^2}}}\right]$$

wherein $\hat{Y}$ represents the input sample to the soft slicer and y represents the transmitted symbols belong to the constellation mapping $\Psi$.

14. An apparatus for estimating a transmitted symbol, the transmitted symbol being points in a constellation, the method comprising:
- means for receiving a sample;
- means for estimating Signal-to-Noise Ratio (SINR) of the sample; and
- means for estimating the transmitted symbol based on the SINR and the sample, wherein at least one symbol or SINR value is stored in a memory storage unit, and wherein each region of the constellation map has a corresponding estimate value;
- means for quantizing the symbol to a generate a first value to a region of the constellation map; and
- means for determining an estimate value corresponding to the region of the constellation map.

15. The apparatus as in claim 14, further comprising; means for quantizing the symbol to a first value selected from a set of N values; means for determining an entry of the memory storage unit corresponding to the first value and said SINR.

16. The apparatus as in claim 15, wherein means for quantizing the symbol comprises:
- means for quantizing the symbol using a Minimum Euclidean Distance criterion.

17. The apparatus as in claim 14, wherein the estimate values are stored in the memory storage unit for a set of SINR values, and wherein the apparatus further comprises: means for interpolating entries in the memory storage unit to determine a first estimate value for SINR value, wherein the first SINR value is not in the set of SINR values.

18. The apparatus as in claim 14, wherein each region of the constellation map has a rectangular shape.

19. The apparatus as in claim 14, wherein the memory storage unit includes entries identified by SINR and estimate value.

20. An apparatus for estimating a transmitted symbol, the transmitted symbol being points in a constellation, the method comprising:
- means for receiving a sample;
- means for estimating Signal-to-Noise Ratio (SINR) of the sample;
- means for estimating the transmitted symbol based on the SINR and the sample;
- means for determining a first estimate based on the SINR and the received sample; and
- means for determining a second estimate based on a combination of the first estimate, the SINR, and the received sample, wherein the first estimate is defined as:

$$\sigma_1(\hat{y}_i),$$

and the second estimate is given as:

$$\sigma_1(\hat{y}_i)+(\hat{y}-\hat{y}_i)\sigma_2(\hat{y}_i),$$

wherein each $\sigma$ represents a unique mapping of a sample value to an estimate value, $\hat{y}$ represents the received sample, and $\hat{y}_i$ is a quantized version of the received sample.

21. The apparatus as in claim 20, wherein the first estimate is calculated using a minimum distance slicer.

22. The apparatus as in claim 20, wherein the second estimate is equal to the first estimate plus a correction term.

23. The apparatus in claim 20, wherein means for determining the first estimate comprises: means for quantizing the received sample to form a quantized sample; means for generating a first estimate based on the quantized sample; and means for generating a second estimate based on the first estimate.

* * * * *